United States Patent Office 3,243,969
Patented Apr. 5, 1966

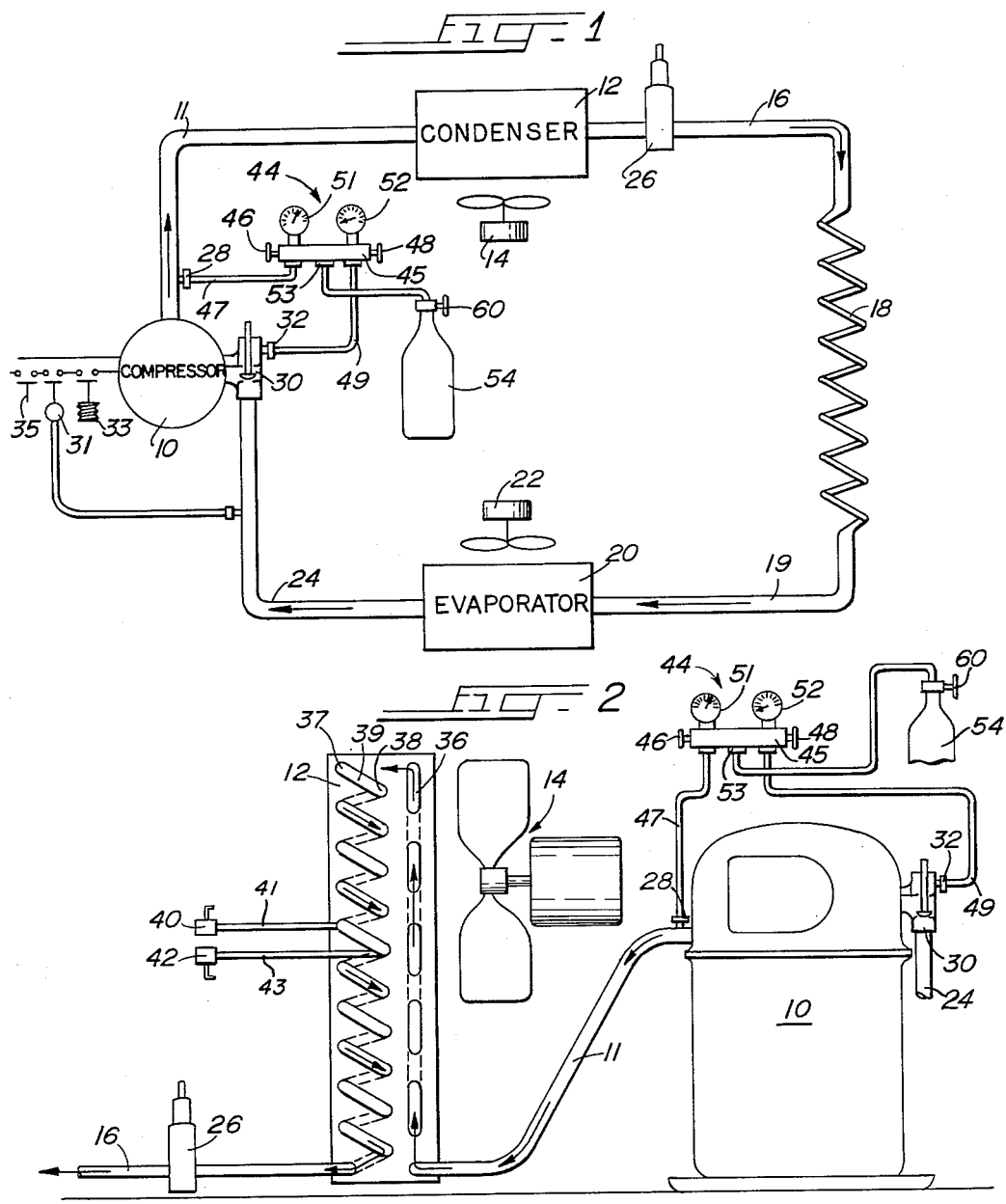

3,243,969
ARRANGEMENT AND METHOD FOR CHARGING REFRIGERANT INTO A CAPILLARY-CONTROLLED REFRIGERATION SYSTEM
William R. Dirk, Marshalltown, Iowa, assignor to Lennox Industries Inc., a corporation of Iowa
Filed Jan. 27, 1964, Ser. No. 340,465
8 Claims. (Cl. 62—77)

This invention relates to a capillary-controlled refrigeration system and, more particularly, to a novel method and to apparatus for more simply and with accuracy charging refrigerant into a capillary-controlled refrigeration system.

At the time of assembly of a domestic or commercial air conditioning unit including a capillary-controlled refrigeration system, the manufacturer charges a predetermined quantity of refrigerant into the system. A refrigerant system utilizing a liquid refrigerant expanding device in the form of a capillary tube is simple in operation, however no modification is possible to adjust the rate of expansion under various operating conditions. The bore and length of the capillary tube, as well as the proportions of the rest of the refrigeration system, are critical. Thus, the quantity of charge in such refrigeration system is critical in order to obtain maximum refrigerant capacity performance from the refrigeration system. It is because of the criticality of the refrigerant charge that refrigeration systems having capillary tube expansion means are normally factory charged.

Subsequently, if the refrigeration system developed a leak, resulting in loss of a portion of the refrigerant charge, repair of the refrigeration system and recharging thereof in the field was normally effected by dumping the entire refrigerant charge and then weighing in a factory-prescribed quantity of refrigerant. Replacement of the full charge of refrigerant by weight was an expensive and impractical way to service capillary-controlled refrigeration systems. Other methods of field charging a capillary-controlled refrigeration system were complex and not accurate enough to provide the precise charge required in such systems for maximum capacity performance.

An object of this invention is to provide apparatus for permitting a capillary-controlled refrigeration system to be field charged in an expeditious and accurate fashion.

Another object of the invention is to provide apparatus comprising condenser liquid-level "go" and "no-go" detecting means for ascertaining when the proper quantity of refrigerant has been added to a capillary-controlled refrigeration system, without necessitating dumping of the entire refrigerant charge and weighing in a factory-prescribed quantity of refrigerant.

A further object of the present invention is to provide an improved method of field charging a capillary-controlled refrigeration system with precision without requiring dumping of the refrigerant charge in such system. Other objects and advantages of the present invention will become more apparent hereinafter.

The specific details of a preferred embodiment of the invention and their mode of functioning will be made most manifest and particularly pointed out in clear, concise and exact terms in conjunction with the accompanying drawings, wherein:

FIGURE 1 is a schematic diagram of a capillary-controlled refrigeration system with which the present invention may be utilized; and FIGURE 2 is a side view of a portion of the capillary-controlled refrigeration system including the compressor and the condenser and illustrating the novel arrangement for accurately field charging the refrigeration system.

Referring to FIGURE 1, there is illustrated a capillary-controlled refrigeration system with which the present invention may be utilized. The refrigeration system comprises a compressor 10 which delivers relatively hot gaseous refrigerant through discharge line 11 to the condenser 12. The compressor is preferably a hermetically sealed motor compressor unit. The vaporous refrigerant is converted to the liquid phase in the condenser 12 as air at ambient temperatures is circulated over the condenser by the fan means 14. It will be understood that if desired, the condenser 12 may be water cooled rather than air cooled.

From the condenser, liquid refrigerant flows through liquid line 16 to the capillary tube expansion means 18. The refrigerant flows from the capillary tube 18 to the evaporator 20 through line 19. A change in phase occurs in the evaporator as air at room temperature is circulated over the evaporator 20 by a fan means 22. The refrigerant vapor returns to the inlet side of the compressor 10 through the suction line 24.

Valve means are provided in the refrigeration system to facilitate servicing and charging. Such valve means may comprise a liquid line service valve 26 disposed in liquid line 16, a discharge service valve 28 disposed in the discharge line 11, and a suction service valve 30 disposed in suction line 24 adjacent to compressor 10. The discharge valve 28 is preferably a Shrader fitting which functions as a processing port. Tightening a quick coupler onto the fitting of valve 28, depresses the Shrader valve core and opens the refrigeration system to the gauge line and service gauge manifold of a field service charging kit as will be more fully considered hereinafter.

The means for controlling compressor 10 may include a low pressure switch 31 operatively connected to the suction line and adapted to interrupt the circuit to the compressor upon attainment of a predetermined suction pressure. Other control means for regulating the flow of current to the motor in compressor 10 may include a thermostat 33 and a manually actuated switch 35.

Referring to FIGURE 2, there is illustrated a portion of the refrigeration system of FIGURE 1 including the "go" and "no-go" refrigerant liquid level detecting means for ascertaining when the refrigerant system has been properly charged in the field. Though the compressor 10 is shown as a high speed vertically disposed hermetically enclosed motor compressor unit, it will be understood that other types of refrigerant compressors may be utilized.

To successfully utilize the present invention, the condenser 12 must be circuited so as to provide for gravity drain of the refrigerant passing therethrough. As seen in FIGURE 2, refrigerant discharged from compressor 10 will pass through the discharge line 11 into the bottom of a first row of tubes 36 in condenser 12. The refrigerant then flows into alternate tubes in rows 37 and 38. The vaporous refrigerant condenses in condenser 12 and drains by gravity from the tubes in rows 37 and 38. The tubes in adjacent rows 37 and 38 are interconnected by return bends 39 to form a continuous refrigerant flow path of generally serpentine configuration.

Liquid-level detecting means are provided in a predetermined location on the condenser coil 12 for ascertaining when the refrigeration system has been exactly charged. Such liquid-level detecting means comprise a pair of petcocks test valves 40 and 42 disposed in tubes or conduits 41 and 43 located one above the other on the condenser coil. The conduits 41 and 43 may be affixed to rows 37 and 38, respectively, of the condenser coil. Conduit 43 and test valve 42 are connected to the tube in the condenser 12 which becomes the liquid level when the refrigeration system is exactly charged and when all the refrigerant is stored in the gravity fill section of the condenser as occurs during "pump down" operation. Essentially, the petcocks are located on the condenser in such manner that when the refrigeration system is properly charged, gas may be bled from the upper petcock 40 and liquid may be bled from the lower petcock 42. If liquid is present when the petcock 40 is opened, then the system is overcharged. On the other hand, if no liquid is found at the lower petcock, then the system is undercharged and refrigerant must be added.

To field test the capillary-controlled refrigeration system, service gauge means 44 are connected to the refrigeration system. The service gauge means 44 comprises a manifold or body 45 having a pair of manually actuated valves 46 and 48 defined therein. The discharge pressure gauge valve 46 is connected to discharge valve 28 by means of gauge line 47. The suction pressure gauge valve 48 is connected to fitting 32 on suction valve 30 by means of suction pressure gauge line 49. A pressure gauge 51 is associated with discharge pressure gauge valve 46 for reading discharge pressure. A similar pressure gauge 52 is associated with suction pressure gauge valve 48 for reading suction pressure.

The manifold 45 is provided with a center port 53 which is adapted to be connected to a tank 54 of refrigerant for adding refrigerant charge to the refrigeration system. Alternatively, when it is desired to evacuate and dehydrate the system, the center port 53 may be connected to a vacuum pump (not shown) rather than to a tank of refrigerant.

To ascertain whether there is a proper refrigerant charge in the system, the condenser 12 should be blocked from top to bottom with cardboard or like material. Adjust the thermostat for its lowest setting and actuate the compressor. The passage of air over the condenser coil is restricted until the discharge pressure gauge 51 reads about 300 pounds per square inch. The compressor should be maintained operative for about three minutes at this condition to maintain condenser head pressure at about 300 p.s.i.g. or within the range of 295 to 305 p.s.i.g.

After three minutes of operation in this condition, the liquid line service valve 26 is closed and the system is allowed to "pump down." At this time, all the refrigerant in the system is discharged into the high side between the compressor and liquid line service valve 26 and a predetermined level of liquid refrigerant is stored in condenser 12. Operation of the compressor is terminated automatically when the low pressure switch 31 cycles off upon attainment of a predetermined suction pressure or manually upon attainment of a predetermined low suction pressure, for example, seven p.s.i.g., as indicated on gauge 52.

Within no longer than two or three minutes after the compressor is stopped, either as a result of actuation of the low pressure switch or from manual actuation of switch 35 upon attainment of a predetermined suction pressure, the lower of the two liquid level petcocks or test valves is opened. If liquid refrigerant passes through the petcock or test valve 42 when it is opened, this would indicate that there may be an adequate charge of refrigerant in the system.

To verify the nature of the refrigerant charge if liquid is present at the lower cock 42, open the upper test valve 40. The valves 40 and 42 may be actuated by handles permanently affixed thereto or by means of an Allen wrench. If gas is emitted from the port thereof, then the refrigerant system is properly charged. If liquid is present in the upper level and discharges through the test valve 40, then the refrigeration system is overcharged. If an overcharge is noted, bleed off the excess refrigerant at the upper level through the test valve 40 until only gas is emitted. Then the test valve or petcock 40 should be closed. The refrigeration system is properly charged.

On the other hand, if no liquid is found at the lower petcock 42 when it is open, then the refrigeration system is undercharged and refrigerant must be added.

The refrigeration system may be charged by connecting the service gauge unit to the system as indicated in FIGURE 2. Open or backseat the liquid line service valve 26 and start the compressor.

A limited quantity of refrigerant may be charged into the system by opening refrigerant tank valve 60 and suction pressure gauge valve 48. Then the condenser should be blocked with cardboard or other material as before to create a predetermined high discharge pressure, for example, about 300 pounds per square inch gauge. Operation of the compressor should be maintained for a minimum of three minutes at this operating condition. With the compressor in operation, the liquid valve 26 is closed and the compressor is operated until it cycles off on the low pressure switch 31, or until a predetermined suction pressure is attained, at which time operation of the compressor 10 is terminated manually upon opening of switch 35. With the system inoperative, open the lower of the two liquid-level cocks. If liquid is available through the test valve 42, this would indicate there may be an adequate charge in the system. This may be verified as before by opening the upper test valve 40. If gas is emitted from the upper test valve, then the system is properly charged.

After charging is completed, suction service valve 30 is opened, gauge line 49 is removed and fitting 32 is capped. Similarly, the high pressure gauge line 47 is removed and discharge valve fitting 28 is capped. The liquid line valve 26 is then opened completely.

The present invention provides novel apparatus including "go" and "no-go" twin level indicators for indicating when a capillary-controlled refrigeration system is properly charged. The apparatus is particularly useful for permitting field charging of a capillary-controlled refrigeration system without complete replacement of the charge in such system. As will be apparent, the present arrangement may also be used to completely charge a refrigeration system in the field if, for example, evacuation and dehydration of the system are required.

There has also been provided a novel method for field charging a gravity-controlled refrigeration system by utilizing the gravity drain through a condenser to determine "go" and "no-go" positions for liquid refrigerant. There has been provided a practical method for accurately field charging a capillary-controlled refrigeration system without dumping the charge and weighing in a known quantity of refrigerant. In view of the high cost of refrigerant, the economic savings become readily apparent.

While one embodiment of the invention has been shown and described herein, it will be understood that it is illustrative only and not to be taken as a definition of the scope of the invention, reference being had for this purpose to the appended claims.

I claim:

1. A method of determining the charge of refrigerant in a capillary-controlled refrigeration system including a compressor, an air-cooled condenser, a capillary tube and an evaporator, comprising the steps of restricting the passage of air over the condenser, blocking the liquid line interconnecting the condenser and the capillary tube while operating the compressor until a predetermined refrigerant pressure is obtained, opening a valve positioned at a predetermined level on the condenser to ascertain whether gas or liquid refrigerant is present at such level and opening a valve positioned at a higher level on the condenser than said first valve to ascertain whether gas or liquid is present at said higher level, said refrigerant system being properly charged when liquid refrigerant is present at said predetermined level and gas is present at said higher level.

2. A method of accurately determining the charge of refrigerant in a capillary-controlled refrigerant system including a compressor, an air-cooled condenser having a serpentine flow path therethrough adapted for gravity drain of refrigerant, a capillary tube and an evaporator, comprising the steps of restricting the passage of air over the condenser while operating the compressor to increase the head pressure, blocking the liquid line interconnecting the condenser and the capillary tube while operating the compressor until a predetermined suction pressure is obtained, stopping the compressor upon attainment of said predetermined suction pressure, opening a test valve positioned at a first predetermined level on the serpentine flow path of the condenser to ascertain whether gas or liquid refrigerant is present at such predetermined level, and opening a test valve positioned at a predetermined higher level on the condenser than said first test valve to ascertain whether gas or liquid is present at said higher level, said refrigerant system being properly charged when liquid refrigerant is present at said first predetermined level and gas is present at said higher level.

3. A method of accurately charging a refrigeration system including a compressor, a condenser having a serpentine flow path defined therethrough and circuited for gravity drain of refrigerant, an evaporator and a capillary tube metering means disposed between the condenser and the evaporator, comprising the steps of mounting a service gauge unit in a refrigeration system; adding refrigerant to the refrigeration system through the service gauge unit; restricting the passage of air over the condenser; stopping the flow of refrigerant from the condenser while operating the compressor until a predetermined suction pressure is obtained; terminating operation of the compressor upon attainment of said predetermined suction pressure; opening a test valve positioned at a predetermined level on the condenser within several minutes after terminating operation of the compressor to ascertain whether gas or liquid refrigerant is present at such predetermined level, the presence of liquid refrigerant being indicative that the refrigeration system may be properly charged and the presence of gas indicating that the refrigeration system is undercharged, thereby necessitating the addition of refrigerant; opening a test valve positioned at a higher level on the condenser than said first test valve to ascertain whether gas or liquid is present at said higher level, said refrigeration system being properly charged when gaseous refrigerant is present at said higher level and being overcharged when liquid refrigerant is present in said higher level; and bleeding liquid refrigerant through said second test valve if the refrigeration system is overcharged until there is no liquid refrigerant passing through the second test valve.

4. In a refrigeration system, the combination of a compressor, an air-cooled condenser having a serpentine flow path therethrough adapted for gravity drain of refrigerant, a capillary refrigerant metering means, and an evaporator interconnected to form a refrigerant circuit, a liquid line shut-off valve disposed between the condenser and the capillary refrigerant metering means for closing the liquid line and permitting build up of liquid refrigerant in the condenser to a predetermined liquid level during pump-down operation, and liquid level detecting means on the condenser comprising a first valve means at the predetermined liquid level in the condenser defined when all the refrigerant in the refrigeration system is stored in the discharge line and the condenser as occurs during pump-down operation, and a second valve means on the condenser at a predetermined level above the first predetermined liquid level, said liquid level detecting means functioning in a go, no-go manner for ascertaining when there is a proper charge of refrigerant in the refrigeration system.

5. In a refrigeration system, the combination of a compressor, a condenser having a flow path defined therethrough circuited for gravity drain of refrigerant, a capillary tube and an evaporator interconnected to form a refrigerant circuit, a shut-off valve for selectively terminating the flow of refrigerant from said condenser and thereby permitting the build up of liquid refrigerant in the condenser to a predetermined liquid level during pump-down operation, and test valve means on the condenser communicating with the flow path defined therethrough, said test valve means comprising a first test valve mounted on the condenser at the predetermined liquid level defined when the refrigerant in the refrigeration system is stored in the discharge line and the condenser as occurs during pump-down operation and a second test valve mounted on the condenser at a predetermined higher level above the first test valve, said test valves being operative in a go, no-go manner for ascertaining when the refrigeration system is properly charged, said refrigeration system being properly charged when liquid refrigerant is present when said first test valve is opened and when gaseous refrigerant is present when said second test valve is opened.

6. A refrigeration system as in claim 5, wherein said condenser comprises a plurality of tubes interconnected at the ends by return bends to define a serpentine refrigerant flow path, said first test valve being operatively associated with a first tube disposed at said predetermined liquid level and said second test valve being operatively associated with a second tube above said first tube.

7. A refrigeration system as in claim 5, wherein said condenser is upright and comprises a plurality of generally horizontally disposed tubular members and return bends connecting adjacent tubular members to define a serpentine refrigerant flow path, said first test valve being operatively associated with a first tubular member disposed substantially at said predetermined liquid level and said second test valve being operatively associated with an adjacent tubular member disposed above said first tubular member.

8. A refrigeration system comprising a compressor, a first heat exchanger having a flow path therethrough adapted for gravity drain of refrigerant, a discharge line connecting said compressor and said first heat exchanger, a conduit including a fixed flow restricting means, a second heat exchanger, and a suction line series connected to form a closed refrigerant circuit in which the compressor withdraws low pressure gaseous refrigerant from the second heat exchanger and discharges high pressure gaseous refrigerant to the first heat exchanger, said first heat exchanger being capable of containing the entire refrigerant charge for the refrigeration system; a normally-open valve disposed in said conduit between said first heat exchanger and said fixed flow restricting means, said valve being adapted when closed to terminate the flow of refrigerant from said first heat exchanger, thereby permitting substantially all of the refrigerant in said system to collect as liquid in said first heat exchanger, and level detecting means on said first heat exchanger comprising a first valve means at a predetermined liquid level on the first heat exchanger and a second valve means at a higher predetermined level on the first heat exchanger, each of said valve means communicating with said flow path, whereby, when the refrigeration system is properly charged, liquid refrigerant will be discharged when the first valve means is opened and gaseous refrigerant will be discharged when the second valve means is opened.

References Cited by the Examiner

UNITED STATES PATENTS

| 2,160,276 | 5/1939 | McKee | 62—129 |
| 2,178,020 | 10/1939 | Kucher | 62—77 X |
| 3,118,463 | 1/1964 | Lacart | 62—77 X |
| 3,163,015 | 12/1964 | Spofford | 62—292 X |

FOREIGN PATENTS 579,291   6/1933   Germany.

ROBERT A. O'LEARY, *Primary Examiner.*

LLOYD L. KING, *Examiner.*